(12) United States Patent
Fukuman et al.

(10) Patent No.: US 10,436,900 B2
(45) Date of Patent: Oct. 8, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 42 days.

(21) Appl. No.: 14/919,562

(22) Filed: Oct. 21, 2015

(65) Prior Publication Data

US 2016/0116588 A1 Apr. 28, 2016

(30) Foreign Application Priority Data

Oct. 22, 2014 (JP) .................................. 2014-215094

(51) Int. Cl.
*G01S 15/00* (2006.01)
*G01S 15/93* (2006.01)
(Continued)

(52) U.S. Cl.
CPC ........ *G01S 15/931* (2013.01); *G01S 7/52001* (2013.01); *G01S 7/52004* (2013.01);
(Continued)

(58) Field of Classification Search
None
See application file for complete search history.

(56) References Cited

U.S. PATENT DOCUMENTS

| 3,418,325 A | 12/1968 | Nigel |
| 3,418,625 A | 12/1968 | Anstey |

(Continued)

FOREIGN PATENT DOCUMENTS

| CN | 103605125 | 2/2014 |
| JP | S63127179 | 5/1988 |

(Continued)

OTHER PUBLICATIONS

U.S. Appl. No. 14/880,526, filed Oct. 12, 2015, Fukuman, et al.
(Continued)

*Primary Examiner* — Hovhannes Baghdasaryan
(74) *Attorney, Agent, or Firm* — Knobbe, Martens, Olson & Bear, LLP (57) ABSTRACT

An object detection apparatus is applied to a movable body including an object detection sensor which transmits a search wave and receives a reflected wave of the search wave as detection information of an object, and detects the object present around the movable body based on the detection information. The apparatus includes a frequency detection section which detects an occurrence frequency of a disturbance signal at the same time within a predetermined transmission time period determined with reference to a transmission period of the search wave, and a disturbance determination section which determines presence or absence of occurrence of disturbance based on the occurrence frequency detected by the frequency detection section.

3 Claims, 3 Drawing Sheets (51) Int. Cl.
| | |
|---|---|
| *G01S 7/52* | (2006.01) |
| *G01S 7/527* | (2006.01) |
| *G01S 15/46* | (2006.01) |
| *G01S 15/87* | (2006.01) |
| *G01S 7/02* | (2006.01) |
| *G01S 7/40* | (2006.01) |

(52) U.S. Cl.
CPC .............. *G01S 7/527* (2013.01); *G01S 15/46* (2013.01); *G01S 15/878* (2013.01); *G01S 7/023* (2013.01); *G01S 2007/4039* (2013.01); *G01S 2007/52009* (2013.01); *G01S 2015/465* (2013.01); *G01S 2015/938* (2013.01)

(56) References Cited

U.S. PATENT DOCUMENTS

| | | | |
|---|---|---|---|
| 5,122,990 | A | 6/1992 | Deines |
| 5,315,562 | A | 5/1994 | Bradley |
| 5,689,250 | A * | 11/1997 | Kremser .................. G01S 7/527 340/435 |
| 5,761,155 | A | 6/1998 | Eccardt et al. |
| 5,923,282 | A | 7/1999 | Honma et al. |
| 5,940,011 | A | 8/1999 | Agravante et al. |
| 6,289,282 | B1 | 9/2001 | Hassler |
| 6,434,486 | B1 | 8/2002 | Studt |
| 6,898,528 | B2 | 5/2005 | Zorka |
| 7,068,155 | B2 | 6/2006 | Kade |
| 7,202,776 | B2 | 4/2007 | Breed |
| 7,873,181 | B1 | 1/2011 | Maluf |
| 8,108,147 | B1 | 1/2012 | Blackburn |
| 8,452,506 | B2 | 5/2013 | Groult |
| 8,605,947 | B2 | 12/2013 | Zhang et al. |
| 8,989,944 | B1 | 3/2015 | Agarwal et al. |
| 9,221,396 | B1 | 12/2015 | Zhu et al. |
| 9,507,023 | B2 | 11/2016 | Nakano |
| 9,541,644 | B2 | 1/2017 | Hoenes et al. |
| 2002/0047780 | A1 | 4/2002 | Nishimoto |
| 2003/0195704 | A1 | 10/2003 | Sekiguchi |
| 2004/0238249 | A1 | 12/2004 | Kim |
| 2005/0046606 | A1 | 3/2005 | Yoneda |
| 2005/0195071 | A1 | 9/2005 | Ewerhart et al. |
| 2006/0013069 | A1 | 1/2006 | Wilson |
| 2006/0031015 | A1 | 2/2006 | Paradie |
| 2006/0085177 | A1 | 4/2006 | Toyama et al. |
| 2006/0119473 | A1 | 6/2006 | Gunderson et al. |
| 2007/0176822 | A1 | 8/2007 | Shirakawa |
| 2008/0068146 | A1 | 3/2008 | Cauldwell |
| 2008/0204208 | A1 | 8/2008 | Kawamata et al. |
| 2009/0299662 | A1 | 12/2009 | Fehrenbach |
| 2010/0214872 | A1 | 8/2010 | Schmid et al. |
| 2011/0044507 | A1 | 2/2011 | Strauss et al. |
| 2011/0133917 | A1 | 6/2011 | Zeng |
| 2011/0241857 | A1 | 10/2011 | Brandenburger et al. |
| 2012/0283895 | A1 | 11/2012 | Noda |
| 2012/0307594 | A1 * | 12/2012 | Inoue .................. G01S 7/52004 367/99 |
| 2014/0340993 | A1 | 11/2014 | Honda |
| 2015/0097704 | A1 | 4/2015 | Kwon |
| 2015/0310281 | A1 | 10/2015 | Zhu et al. |
| 2016/0253575 | A1 | 9/2016 | Kakegawa et al. |
| 2017/0261602 | A1 | 9/2017 | Olshansky et al. |

FOREIGN PATENT DOCUMENTS

| | | |
|---|---|---|
| JP | H06-138225 | 5/1994 |
| JP | H06-150195 | 5/1994 |
| JP | 2005-070943 | 3/2005 |
| JP | 2008-039497 | 2/2008 |
| JP | 2008-122137 | 5/2008 |
| JP | 2013-124982 | 6/2013 |
| JP | 2014-089077 A | 5/2014 |
| JP | 2014-093039 | 5/2014 |
| JP | 2015-004562 | 1/2015 |
| KR | 2013-0119674 | 11/2013 |
| WO | WO 2005/091015 | 9/2005 |

OTHER PUBLICATIONS

U.S. Appl. No. 14/918,330, filed Oct. 20, 2015, Fukuman, et al.
U.S. Appl. No. 14/887,623, filed Oct. 20, 2015, Fukuman, et al.
U.S. Appl. No. 14/887,625, filed Oct. 20, 2015, Fukuman, et al.
U.S. Appl. No. 14/918,373, filed Oct. 20, 2015, Fukuman, et al.
U.S. Appl. No. 14/918,920, filed Oct. 21, 2015, Fukuman, et al.
U.S. Appl. No. 14/919,498, filed Oct. 21, 2015, Fukuman, et al.
U.S. Appl. No. 14/918,319, filed Oct. 20, 2015, Fukuman, et al.
Chinese document, "the basic characteristics of a multiple echo" in 8 pages.
Installation and Operation of Ship Navigation System, Beijing Institute of Technology Press, dated Aug. 2014 in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.
United States Patent and Trademark Office, Office Action, U.S. Appl. No. 14/887,623, dated Aug. 30, 2017 in 21 pages.
United States Patent and Trademark Office, Final Office Action, U.S. Appl. No. 14/887,623, dated May 7, 2018 in 38 pages.
United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/918,920, dated Feb. 23, 2017 in 13 pages.
United States Patent and Trademark Office, Office Action, U.S. Appl. No. 14/918,920, dated Dec. 15, 2017 in 13 pages.
United States Patent and Trademark Office, Office Action, U.S. Appl. No. 14/887,625, dated May 10, 2018 in 26 pages.
United States Patent and Trademark Office, Notice of Allowance, U.S. Appl. No. 14/918,920, dated Apr. 11, 2018 in 7 pages.
United States Patent and Trademark Office, Advisory Action, U.S. Appl. No. 14/880,526, dated May 25, 2018, in 4 pages.
United States Patent and Trademark Office, Final Office Action, U.S. Appl. No. 14/918,319, dated Jul. 19, 2018 in 12 pages.
Tian Fenxia, "Pipeline Obstacle Detecting and Locating Based on Ultrasonic Waves", Southwest Jiaotong Postraduate Dissertation, Jun. 2013, TP391, p. 30.
Office Action of U.S. Appl. No. 14/880,526 dated Oct. 9, 2018.
Notice of Allowance of U.S. Appl. No. 14/918,373 dated Oct. 18, 2018.
Notice of Allowance of U.S. Appl. No. 14/918,920 dated Oct. 18, 2018.
Notice of Allowance and Fee(s) Due, U.S. Appl. No. 14/887,623, dated Sep. 4, 2018, in 28 pages.
Corrected Notice of Allowance and Fee(s) Due, U.S. Appl. No. 14/887,623, dated Sep. 11, 2018, in 5 pages.
Notice of Allowance and Fee(s) Due, U.S. Appl. No. 14/887,625, dated Sep. 10, 2018, in 14 pages.
Office Action, U.S. Appl. No. 14/918,330, dated Sep. 11, 2018, in 14 pages.
Notice of Allowance and Fee(s) Due, U.S. Appl. No. 14/918,920, dated Jun. 11, 2018, in 11 pages.

(56) References Cited

OTHER PUBLICATIONS

Office Action of U.S. Appl. No. 14/918,319 dated May 28, 2019.
Notice of Allowance for U.S. Appl. No. 14/880,526; dated May 22, 2019.
Final Office Action for U.S. Appl. No. 14/918,330, dated Feb. 12, 2019.
Notice of Allowance for U.S. Appl. No. 14/880,526; dated Feb. 13, 2019.
Notice of Allowance for U.S. Appl. No. 14/918,373; dated Jun. 12, 2019.
Notice of Allowance for U.S. Appl. No. 14/918,330; dated Jun. 5, 2019.

* cited by examiner

OBJECT DETECTION APPARATUS

CROSS-REFERENCE TO RELATED APPLICATION

This application is based on and claims the benefit of priority from earlier Japanese Patent Application No. 2014-215094 filed Oct. 22, 2014, the description of which is incorporated herein by reference.

BACKGROUND

Technical Field

The present invention relates to an object detection apparatus which detects peripheral objects.

Related Art

Conventionally, techniques are proposed in which a range sensor such as an ultrasonic sensor is installed in an own vehicle to detect objects present around the own vehicle, the objects including a preceding vehicle, a pedestrian, and an obstacle. In addition, based on the detection results, various controls for improving running safety of the own vehicle are performed such as operation of the brake unit and an alarm to the driver (for example, refer to JP-A-2014-89077).

In the object detection apparatus disclosed in JP-A-2014-89077, a plurality of range sensors are installed in the own vehicle to calculate the position of an object in the vehicle width direction according to the principle of triangulation. In addition, when the position of the object in the vehicle width direction is within a range of the vehicle width, it is determined that the object is detected. When the position of the object in the vehicle width direction is not within the range of the vehicle width, it is determined that the object is not detected. According to the control, the object present at a position where the probability of the contact with the own vehicle is lower is prevented from erroneously detected.

In a case where an object is detected by using range sensors, the object may be detected at an incorrect position due to the influence of exterior environments such as snow, rain, and mutual interference with a sensor of another vehicle. In this case, it is concerned that control for preventing the contact with the detected object is undesirably performed, or the control for preventing the contact is not performed though required to be performed.

SUMMARY

An embodiment provides an object detection apparatus which can accurately determine a situation where reliability of detection information of an object becomes lower due to the influence of exterior environments.

An embodiment provides an object detection apparatus which is applied to a movable body including an object detection sensor which transmits a search wave and receives a reflected wave of the search wave as detection information of an object, and detects the object present around the movable body based on the detection information. The apparatus includes: a frequency detection section which detects an occurrence frequency of a disturbance signal at the same time within a predetermined transmission time period determined with reference to a transmission period of the search wave; and a disturbance determination section which determines presence or absence of occurrence of disturbance based on the occurrence frequency detected by the frequency detection section.

DETAILED DESCRIPTION OF THE PREFERRED EMBODIMENTS

With reference to the accompanying drawings, hereinafter are described various embodiments. Throughout the drawings, components identical with or similar to each other are given the same numerals for the sake of omitting unnecessary explanation.

Hereinafter, the embodiment is described in which an object detection apparatus installed in a movable body is embodied, with reference to the drawings. The object detection apparatus according to the present embodiment is an in-vehicle apparatus installed in a vehicle, which is a movable body. The object detection apparatus receives detection information on an object from a range sensor serving as an object detection sensor to detect (for example, another vehicle, a road structure, or the like) as an object present around the vehicle. First, the schematic configuration of an object detection system for a vehicle according to the present embodiment is explained with reference to FIG. 1.

Figure 1:
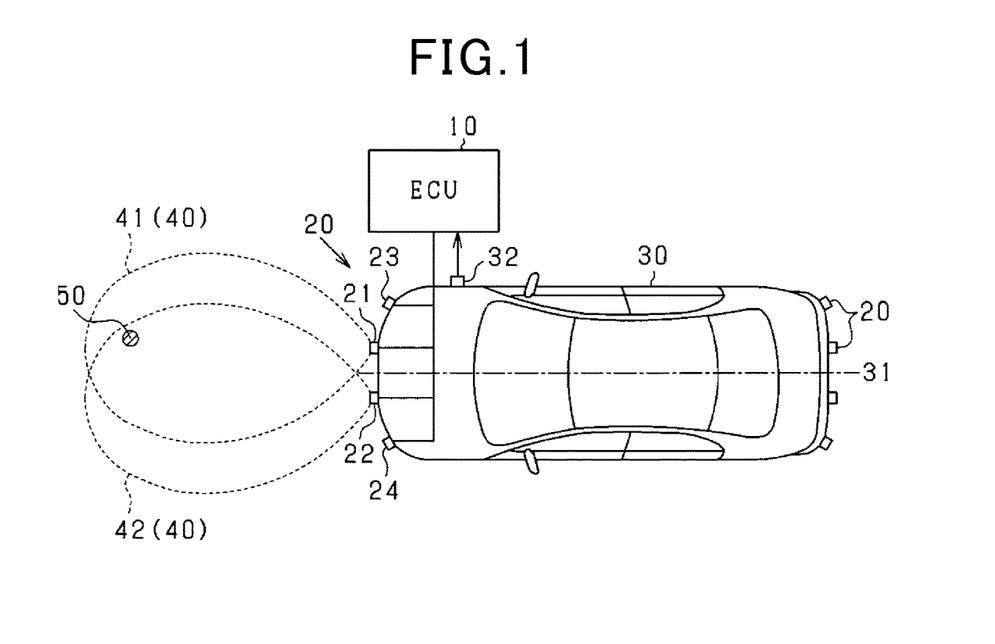
FIG. 1 is a drawing showing a schematic configuration of an object detection apparatus.

In FIG. 1, a range sensor 20 is, for example, an ultrasonic sensor, and has a function for transmitting ultrasonic waves with wavelengths of 20 to 100 kHz as search waves and receiving the search waves reflected from an object as reflected waves. In the present embodiment, four sensors are attached to the front part (e.g. front bumper) of a vehicle 30 predetermined distances so as to be arranged in the vehicle width direction perpendicular to the traveling direction of the vehicle 30. Specifically, the range sensor 20 includes two center sensors (first center sensor 21 and second center sensor 22) attached in the vicinity of a center line 31 of the vehicle width and at symmetrical positions with respect to the center line 31, and corner sensors 23, 24 respectively attached at the left corner and the right corner of the vehicle 30. Note that the range sensors 20 are also attached to the rear part (e.g. rear bumper) of the vehicle 30. However, since the attachment positions and the function of the range sensors 20 of the rear part are the same as those of the range sensors 20 of the front part, the explanations thereof are omitted.

In each of the range sensors 20, a direct detection range 40 is set as an area where reflected waves (direct wave) of the search waves transmitted therefrom can be received. The range sensors 20 are attached so that the direct detection ranges 40 of the adjacent two range sensors 20 overlap with each other. Note that, in FIG. 1, only direct detection ranges 41, 42 of the two center sensors 21, 22 are shown. However, the direct detection ranges 40 are also set for corner sensors 23, 24. In addition, the direct detection ranges 40 of the adjacent two sensors overlap with each other. In the range sensors 20, a threshold value of the amplitude of a reflected wave is set. When the range sensor 20 receives a reflected wave having the amplitude equal to or more than the threshold value, the range sensor 20 transmits detection information including the time when the range sensor 20 receives the reflected wave to an ECU (electronic control unit) 10 serving as the object detection apparatus.

The ECU 10 is mainly configured by a microcomputer including a CPU and various memories. The ECU 10 determines presence or absence of an object 50 around the vehicle based on the detection information of the object 50 received from the range sensors 20. Specifically, the ECU 10 outputs a control signal to the range sensors 20 to direct the range sensors 20 to transmit ultrasonic waves at predetermined transmission periods (e.g. at several hundred milliseconds intervals) from each of the range sensors 20. In addition, the ECU 10 determines whether or not an object is present around the vehicle based on detection information of the object 50 received from the range sensors 20. If determining that an object 50 is present around the vehicle, the ECU 10 performs steering wheel control or deceleration control of the vehicle 30 as contact avoidance control or gives notification by a warning sound to the driver of the vehicle 30, so that the vehicle 30 does not come into contact with the object 50.

The range sensors 20 transmit ultrasonic waves at predetermined intervals from the sensors 21 to 24 in a predetermined order in accordance with the transmission instruction received from the ECU 10. In the present embodiment, in accordance with the instruction from the ECU 10, first, the first center sensor 21 transmits ultrasonic waves, next, the second center sensor 22 transmits ultrasonic waves, and finally, the two corner sensors 23, 24 transmit ultrasonic waves. Note that the sensors 21 to 24 transmit search waves at intervals so as not to interfere with each other.

The ECU 10 calculates a position (coordinates) of the object 50 relative to the vehicle 30 based on the principle of triangulation by using the detection information of the object received from the range sensors 20. According to the principle of triangulation, as known, coordinates of a measurement point are calculated from a known distance between two points and distances between the known two points and the measurement point. Due to the principle, the ECU 10 calculates an estimated position in the vehicle width direction of the object 50 by using the distance between the two range sensors 20 whose direct detection ranges 40 overlap with each other and the distances between the range sensors 20 and the object 50.

Figure 2:
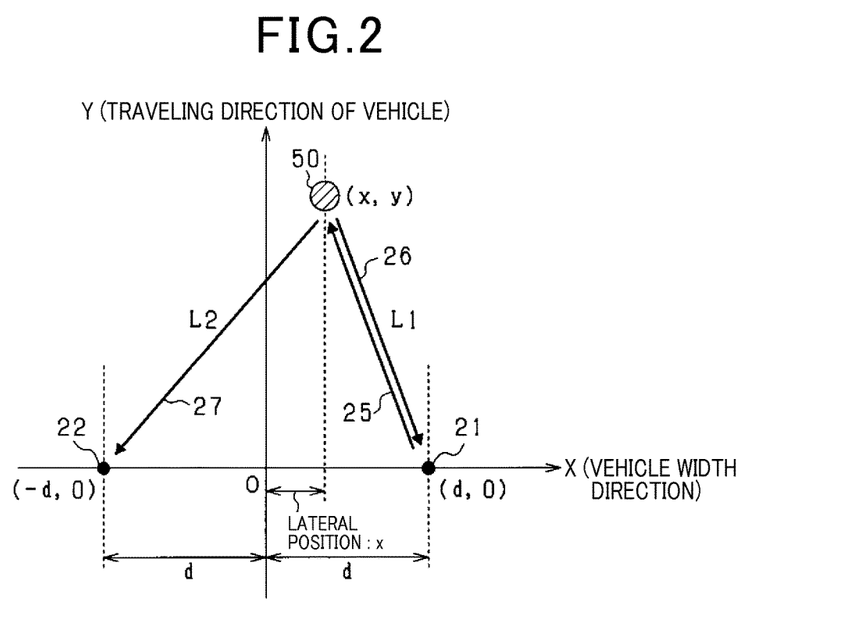
FIG. 2 is a drawing for explaining a method of calculating a position of an object.

FIG. 2 is a drawing for explaining a method of calculating the detected position of the object 50, and shows the two center sensors 21, 22 and the object 50 positioned ahead of the center sensors 21, 22 in plan view. Note that, in FIG. 2, the first center sensor 21 is a direct detection sensor which transmits a search wave and receives a direct wave. The second center sensor 22 is an indirect detection sensor which receives a reflected wave (indirect wave) of the ultrasonic wave transmitted from another sensor. The direct detection sensor and the indirect detection sensor are two sensors performing the triangulation.

The ECU 10 provides a coordinate system in which the X-axis is a straight line connecting the two center sensors 21, 22, and the Y-axis is a straight line passing through the middle of the first center sensor 21 and the second center sensor 22 and perpendicular to the X axis. The ECU 10 calculates an X-coordinate (x) and a Y-coordinate (y) of the coordinate system as a detection position of the object 50. Specifically, the ECU 10 makes the direct detection sensor (in FIG. 2, the first center sensor 21) transmit the search wave 25. Then, when the first center sensor 21 receives the reflected search wave 25 as the direct wave 26, the ECU 10 calculates the distance L1 between the first center sensor 21 and the object 50 based on the received direct wave 26. In addition, when the second center sensor 22 receives the reflected search wave 25 as the indirect wave 27, the ECU 10 calculates the distance L2 between the second center sensor 22 and the object 50 based on the received indirect wave 27.

The distance between the origin O, which is the intersection of the X-axis and the Y-axis, and the first sensor 21 and the distance between the origin O and the second sensor 22, which are distances d, are equal to each other and are previously stored in the ECU 10. In addition, the ECU 10 calculates the time period between the time when the first center sensor 21 transmits the search wave 25 and the time when the first center sensor 21 receives the direct wave 26 as a first time period t1, and calculates the time period between the time when the first sensor 21 transmits the search wave 25 and the time when the second sensor 22 receives the indirect wave 27 as a second time period t2. In this case, the value obtained by multiplying the first time period t1 by the speed of sound is twice the first distance L1. The value obtained by multiplying the second time period t2 by the speed of sound is the sum of the first distance Li and the second distance L2. The ECU 10 calculates the coordinates (x, y) of the object 50 by performing calculation based on the triangulation by using the distance $2d$ between the center sensors 21 and 22, the first time period t1, and second time period t2.

Note that, in FIG. 2, one example is explained in which the first center sensor 21 is a direct detection sensor, and the second center sensor 22 is an indirect detection sensor. However, all the combinations of two sensors, which are adjacent to each other, of the four sensors 21 to 24 establish combinations of the direct detection sensor and the indirect detection sensor. Thereby, by not only the combination of the first center sensor 21 and the second center sensor 22 but also all the combinations, the detection position of the object can be calculated by the principle of triangulation using the direct detection sensor and the indirect detection sensor. In addition, also regarding the range sensors 20 of the rear part of the vehicle, the detection position of the object present around the vehicle is calculated by the principle of triangulation form all the combinations of the two sensors, which are adjacent to each other.

The ECU 10 sets a reliability level determination counter N serving as an indicator indicating a probability that an object is present based on the number of times when the range sensor 20 detects the same object. In the present embodiment, the reliability level determination counter N is increased and decreased for each of the sensors. As the number of times of detecting the same object by the same sensor is larger, the counter value is set to be larger (so as to correspond to higher reliability level). Then, if the reliability level determination counter N exceeds a threshold value, it is determined that the object to be controlled is present around the vehicle 30, whereby the contact avoidance control is permitted to intervene. In addition, if it is determined that the object detected during the last calculation period and the object detected during the current calculation period are different from each other, the reliability level determination counter N is reset. The reliability level determination counter N corresponds to a reliability of an object.

Figure 3:
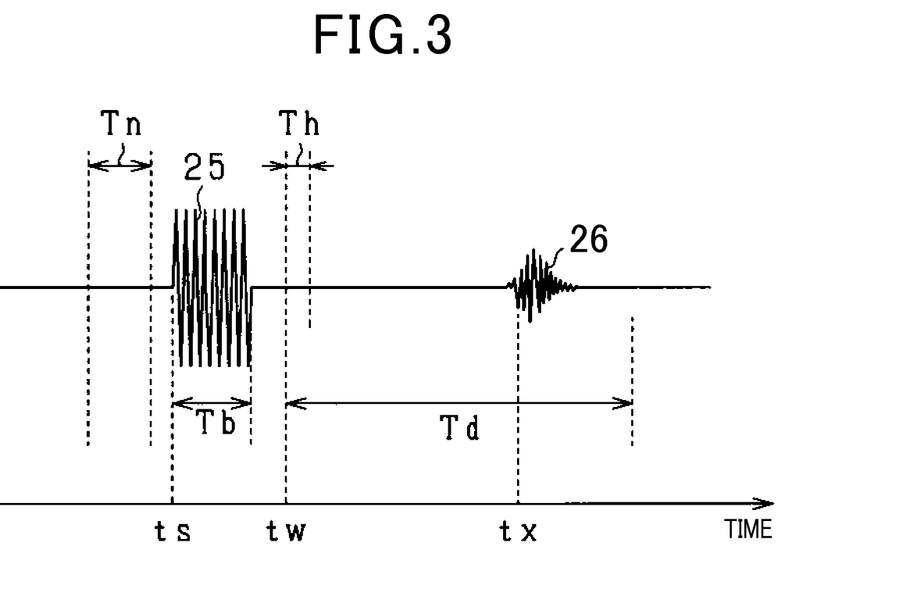
FIG. 3 is a drawing representing a search wave and a reflected wave on the time axis.

FIG. 3 is a drawing representing waveforms of the search wave 25 and the reflected wave 26 on the time axis. Note that, FIG. 3 shows one transmission period of the search wave 25 in one sensor 20. The sensor 20 starts transmission of the search wave 25 at a transmission start time ts. During a constant time period Tb, the sensor 20 continues to transmit the search wave 25. In addition, when the transmitted search wave 25 is reflected from the object 50, the sensor 20 receives a reflected wave 26 at time tx by which the time period corresponding to the distance from the object 50 has passed, within a predetermined object detection time period Td (e.g. several tens msec) after the search wave 25 is transmitted. Note that as the distance between the vehicle 30 and the object 50 is longer, the time period between the start time tw of the object detection time period Td and the reception time tx of the reflected wave 26 becomes longer. The object detection time period Td is a reception time period of the reflected wave 26 for detecting presence or absence of the object 50 which can become an obstacle of the vehicle 30.

In the present embodiment, during a transmission time period determined with reference to the transmission period of the search wave 25, a noise detection time period Tn is set during a time period different from the object detection time period Td and the transmission time period Tb of the search wave 25. The ECU 10 performs a noise detection process based on presence and absence of a reception signal (noise signal) within the noise detection time period Tn. Specifically, as shown in FIG. 3, the noise detection time period Tn is defined in a predetermined time period immediately before the transmission start time is of the search wave 25. If a reception signal having an amplitude equal to or more than a threshold value is detected within the noise detection time period Tn, it is determined that there is noise. Note that, the transmission time period determined with reference to the transmission period of the search wave 25 is a time period between the time when one sensor 20 transmits the search wave 25 and the time when the same sensor 20 transmits the next search wave 25.

If snow or rain comes into contact with the range sensor 20, the sensor 20 may detect an extremely short distance. In addition, when snow or rain comes into contact with a sensor surface of the range sensor 20, or mutual interference is caused with a sensor of another vehicle, noise may appear. When the extremely short detection distance and the production of noise is due to the exterior environment such as snow, rain, and mutual interference with a sensor of another vehicle, the extremely short detection distance and noise are frequently caused continuously as long as the exterior environment is unchanged.

Hence, in the present embodiment, the occurrence frequency of disturbance signals at the same time within the transmission time period determined with reference to the transmission period of the search wave 25 is detected to determine presence or absence of the occurrence of disturbance based on the occurrence frequency. Specifically, (1) a reflected wave received during a predetermined short distance detection time period Th (refer to FIG. 3) including the start time tw of the object detection time period Td, or (2) a noise signal received during the noise detection time period Tn is assumed to be a disturbance signal to detect the number of times (occurrence frequency) of occurrence of disturbance signals within a predetermined determination time period. Then, when the number of times of occurrence of disturbance signals becomes equal to more than a threshold value, it is determined that there is disturbance.

Next, the procedure of a disturbance determination process of the present embodiment is described with reference to the flowchart shown in FIG. 4. This process is performed by the ECU 10 at predetermined calculation periods (e.g. periods shorter than the transmission period of the search wave of the sensor 20 (e.g. intervals of several to several tens msec)). Note that, in the present embodiment, the disturbance determination process shown in FIG. 4 is performed for each sensor to determine presence or absence of disturbance in each sensor.

Figure 4:
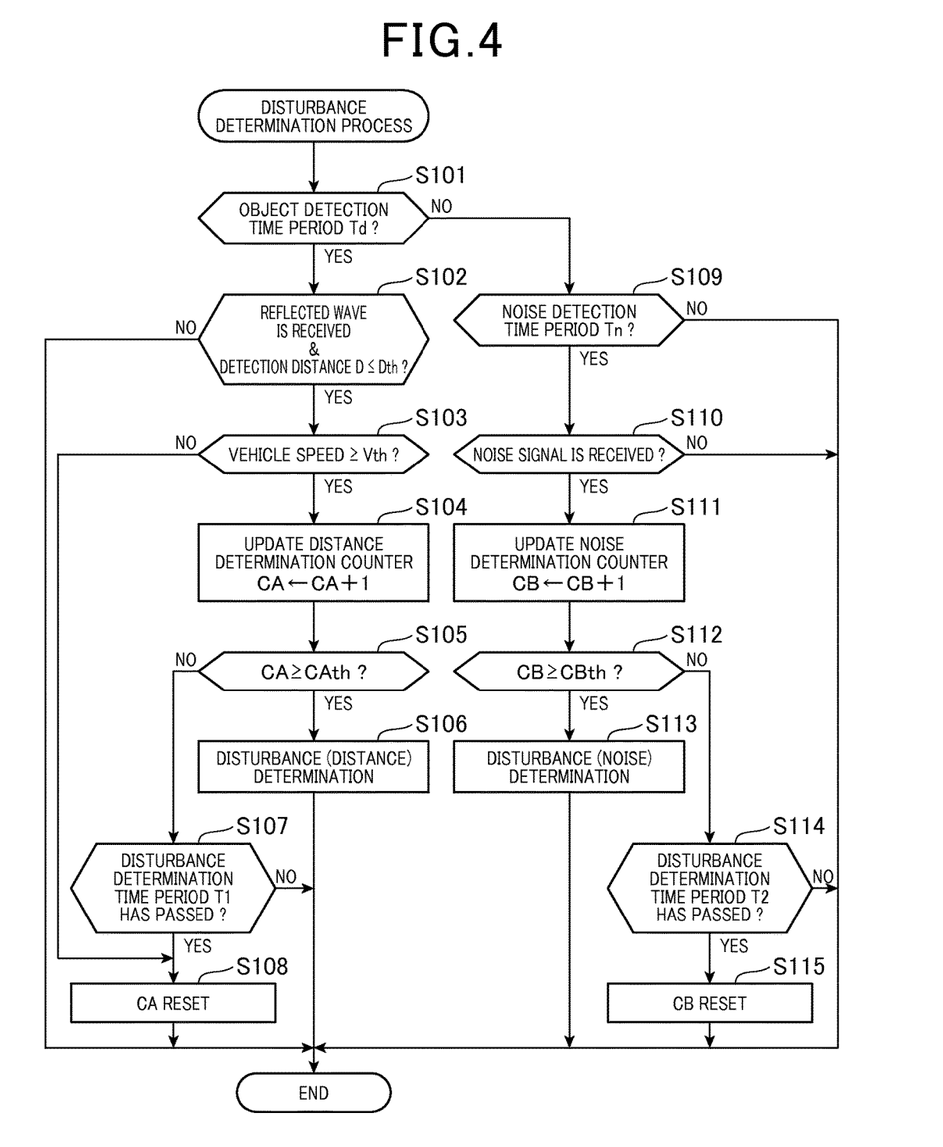
FIG. 4 is a flowchart showing a procedure of a disturbance determination process.

In FIG. 4, in step S101, the ECU 10 determines whether or not it is in the object detection time period Td at the present time. If it is in the object detection time period Td, the process proceeds to step S102, in which the sensor 20 receives a reflected wave, and the ECU 10 determines whether or not a detection distance D calculated based on the received reflected wave is equal to or less than a determination distance threshold value Dth (e.g. several tens of cm). Specifically, the ECU 10 determines whether or not the center sensors 21, 22 attached to the front part of the vehicle 30 have received the reflected wave. If negative determination is made in step S102, the present routine is completed. If affirmative determination is made in step S102, the process proceeds to step S103.

In step S103, the ECU 10 determines whether or not the speed (vehicle speed V) of the vehicle 30 is equal to or more than a distance determination permission vehicle speed Vth (e.g. several tens km/h). Note that the vehicle 30 is provided with a vehicle speed sensor 32. Herein, a detection value of the vehicle speed sensor 32 is used as the vehicle speed V.

If V≥Vth, the process proceeds to step S104, in which the ECU counts up a distance determination counter CA by a predetermined value (e.g. one). In the succeeding step S105, the ECU 10 determines whether or not the distance determination counter CA is equal to or more than a first disturbance determination threshold value CAth. If CA<CAth, the process proceeds to step S107, in which the ECU 10 determines whether or not a disturbance determination time period T1, which is based on the detection distance, has passed. As the disturbance determination time period T1, a time period is set by defining a time point as a starting point when it is initially determined that the detection distance D calculated based on the reflected wave is equal to or less than the determination distance threshold value Dth after the distance determination counter CA is reset. The time period is between the starting point and the time when a predetermined time period has passed.

If it is determined that the disturbance determination time period T1 has not passed is step S107, the routine is halted. In contrast, if it is determined that the disturbance determination time period T1 has passed, the process proceeds to step S108, in which the ECU 10 resets the distance determination counter CA, then the routine is completed. In this case, the frequency of occurrence of a state where the detection distance D is extremely short is less during the disturbance determination time period T1. Hence, the ECU 10 does not determine that there is disturbance. Note that, if it is determined that the speed V is less than the distance determination permission vehicle speed Vth, the ECU 10 similarly resets the distance determination counter CA in step S108

In contrast, if the distance determination counter CA has become equal to or more than the first disturbance determination threshold value CAth before the disturbance determination time period T1 passes, an affirmative determination is made in step S105. Then, the process proceeds to step S106, in which the ECU 10 determines that there is disturbance.

If it is determined that it is in not the object detection time period Td in step S101, the process proceeds to step S109. In step S109, the ECU 10 determines whether or not it is in the noise detection time period Tn at the present time. If it is in the noise detection time period Tn, the process proceeds to step S110, in which the ECU 10 determines whether or not a noise signal is received. If no noise signal is received, the routine is halted.

In contrast, if a noise signal is received during the noise detection time period Tn, the process proceeds to step S111, in which the ECU 10 counts up a noise determination counter CB by a predetermined value (e.g. one). In the succeeding step S112, the ECU 10 determines whether or not the noise determination counter CB is equal to or more than a second disturbance determination threshold value CBth. If CB<CBth, the process proceeds to step S114, in which the ECU 10 determines whether or not a disturbance determination time period T2, which is based on the noise, has passed. As the disturbance determination time period T2, a time period is set by defining a time point as a starting point when it is initially determined that a noise signal is received during the noise detection time period Tn after the noise determination counter CB is reset. The time period is between the starting point and the time when a predetermined time period has passed.

In step S114, if it is determined that the disturbance determination time period T2 has not passed, the routine is halted. In contrast, if it is determined that the disturbance determination time period T2 has passed, the process proceeds to step S115, in which the noise determination counter CB is reset, then the routine is completed. If the noise determination counter CB becomes equal to or more than the second disturbance determination threshold value CBth before the disturbance determination time period T2 passes, an affirmative determination is made in step S112, then the process proceeds to step S113 in which it is determined that there is disturbance.

In a situation where the influence of exterior environmental factors such as snow, rain, and mutual interference with a sensor of another vehicle is exerted, the reliability of detection information of an object obtained by the range sensor 20 becomes lower. Hence, in the present embodiment, if it is determined that there is disturbance in step S106 or step S113, the threshold value of the reliability level determination counter N for permitting the contact avoidance control to intervene is changed so as to be increased. Hence, in a situation where the reliability of detection information of an object obtained by the range sensor 20 is lower, the required number of times of detections is made larger until the control intervenes.

According to the embodiment described above, the following excellent advantages can be obtained.

The occurrence frequency of disturbance signals at the same time within a predetermined transmission time period determined with reference to the transmission period of the search wave 25 is detected to determine presence or absence of the disturbance based on the detected occurrence frequency. The range sensor 20 may detect an extremely short distance or generate noise by being influenced by exterior environmental factors such as snow, rain, and mutual interference with a sensor of another vehicle. In addition, when the extremely short detection distance and the generation of noise are due to exterior environments, the extremely short detection distance and the generation of noise are frequently continued as long as the exterior environment continues unchanged. Focusing on these points, the above configuration can separate presence or absence of the influence of exterior environments and actual obstacles from each other. As a result, the situation can be accurately determined where the reliability of the detection information of an object becomes lower due to the influence of exterior environments.

Specifically, as an aspect of disturbance determination, the reflected wave, which is received during the short distance detection time period Th defined within a time period including the start time tw of the object detection time period Td during the transmission time period determined with reference to the transmission period of the search wave 25, is regarded as a disturbance signal, and presence or absence of disturbance is determined from the occurrence frequency of the disturbance signal. If snow or rain comes into contact with the range sensor 20, the sensor 20 may detect an extremely short distance. In addition, if snow or rain is a cause, the extremely short detection distance is frequently caused. Focusing on these points, the above configuration can be accurately determined where the reliability of the detection information of an object becomes lower due to the influence of snow or rain.

In addition, as another aspect of the disturbance determination, a reception signal, which is received during the noise detection time period Tn determined within a time period different from the transmission time period Tb of the search wave 25 and the object detection time period Td during the transmission time period determined with reference to the transmission time period of the search wave 25, is regarded as a disturbance signal, and presence or absence of disturbance is determined from the occurrence frequency of the disturbance signal. When snow or rain comes into contact with the range sensor 20, or mutual interference is caused with a sensor of another vehicle, noise may appear. In addition, if snow, rain, or mutual interference with a sensor of another vehicle is a cause, noise is frequently generated. Focusing on these points, the above configuration can accurately determine the situation where the reliability of the detection information of an object becomes lower due to the influence of snow, rain, or mutual interference with a sensor of another vehicle.

In the disturbance determination process based on the detection distance D, the disturbance determination is performed on condition that the vehicle speed V is equal to or more than the distance determination permission vehicle speed Vth (e.g. several tens km/h). According to the configuration, signals due to exterior environments and actual obstacles can be accurately separated from each other. Thereby, omission of detection of an object can be prevented.

By using the center sensors 21, 22 provided to the front part of the vehicle, disturbance determination is performed based on the detection distance D. While the influence of snow or rain is larger in the sensor attached to the front part of the vehicle, the influence is relatively smaller in the sensor attached to the rear part or the corner of the vehicle 30. Hence, when the disturbance determination is performed based on the detection distance D by the sensor attached to the rear part or the corner of the vehicle, it can be considered that separation from actual obstacles cannot be sufficiently performed. In addition, in a case of the corner sensors 23, 24, an obstacle may be present in the vicinity of (e.g. within several tens of cm) the vehicle 30, and the actual obstacle and exterior environments are difficult to separate from each other. In view of these points, the above configuration can perform the disturbance determination with high accuracy while preventing omission of detection of an actual obstacle.

Other Embodiments

The present invention is not limited to the above embodiments, and may be implemented as follows.

In the above embodiments, if it is determined that there is disturbance by at least one of the disturbance determination based on the detection distance and the disturbance determination based on noise, the threshold value of the reliability level determination counter N is changed so as to be increased. Alternatively, if it is determined that there is disturbance by both the disturbance determination based on the detection distance and the disturbance determination based on noise, it may be finally determined that there is disturbance. Then, the threshold value of the reliability level determination counter N may be changed so as to be increased.

In the above embodiments, the determination counters CA, CB are set for each of the disturbance determination based on the detection distance and the disturbance determination based on noise to compare the disturbance determination threshold values CAth and CBth with each other. Alternatively, a common counter may be provided for both the disturbance determination based on the detection distance and the disturbance determination based on noise to compare the sum of the number of times of generation of a state where the detection distance is extremely short and the number of times of generation of noise with a determination threshold value, thereby performing disturbance determination.

In the above embodiments, the disturbance determination based on a noise signal may be performed on condition that the speed of the vehicle 30 is equal to or more than a threshold value (noise determination permission vehicle speed). Note that the noise determination permission vehicle speed may be the same as the distance determination permission vehicle speed Vth or different from the distance determination permission vehicle speed Vth.

In the above embodiments, if it is determined that there is disturbance, the threshold value of the reliability level determination counter N is changed so as to be increased. However, another configuration may be utilized if the contact avoidance control is difficult to be permitted to intervene. For example, if it is determined that there is disturbance, the amount of increase of the reliability level determination counter N obtained when the object 50 is detected may be smaller compared with the case where it is not determined that there is disturbance.

In the above embodiments, the disturbance determination is performed based on the detection distance on condition that the vehicle speed V is equal to or more than the distance determination permission vehicle speed Vth. However, regardless of the establishment of the vehicle condition, the disturbance determination may be performed based on the detection distance.

In the above embodiments, as the disturbance determination time periods T1, T2, time periods are set between a starting point which is a time point when it is initially determined that a disturbance signal is received after the determination counter is reset and the time when a predetermined time has passed. However, for example, the determination counter may be reset every time when a predetermined time period has passed to perform the disturbance determination process by defining one time period, at the end of which the determination counter is reset, as the disturbance determination time periods T1, T2.

In the above embodiments, the time period between the time point when it is determined that a disturbance signal is received and the time when a predetermined time period has passed is defined as the disturbance determination time periods T1, T2. Instead of this, the time period at the end of which the number of transmissions of the search wave 25 becomes the predetermined number of times may be defined as the disturbance determination time periods T1, T2.

In the above embodiments, if it is determined by a plurality of range sensors 20 that there is disturbance, it may be finally determined that there is disturbance, and for example, increase the threshold value of the reliability level determination counter N, thereby making it more difficult for the contact avoidance control to intervene. If exterior environmental factors such as snow and rain are causes, the possibility that another sensor also determines that there is disturbance is higher. Hence, according to the above configuration, presence or absence of disturbance can be determined more accurately.

In the above embodiments, a case is described where the range sensors 20 serving as object detection sensors are provided to the front part and the rear part of the vehicle 30. However, the position where the sensors are attached is not limited to this. For example, instead of or in addition to the front part and the rear part of the vehicle 30, the sensors may be provided to right and left side surfaces.

In the above embodiments, as the range sensor 20, a configuration is applied which includes an ultrasonic sensor detecting an object by using ultrasonic waves as search waves. However, a sensor may be applied which transmits a search waves and receives reflected waves of the transmitted search waves to detect an object. For example, a millimeter wave radar, a laser radar, or the like may be utilized which detects an object by using electromagnetic waves as the search waves.

In the above embodiments, an object detection apparatus installed in a vehicle is described as one example. However, for example, the object detection apparatus may be installed in a movable body such as a railway vehicle, a ship, an aircraft, and a robot.

Hereinafter, aspects of the above-described embodiments will be summarized.

An embodiment provides an object detection apparatus (10) which is applied to a movable body (30) including an object detection sensor (20) which transmits a search wave (25) and receives a reflected wave (26) of the search wave as detection information of an object (50), and detects the object present around the movable body based on the detection information. The apparatus includes: a frequency detection section which detects an occurrence frequency of a disturbance signal at the same time within a predetermined transmission time period determined with reference to a transmission period of the search wave; and a disturbance determination section which determines presence or absence of occurrence of disturbance based on the occurrence frequency detected by the frequency detection section.

The range sensor may detect, for example, an extremely short distance or generate noise by being influenced by exterior environments such as snow, rain, and mutual interference with a sensor of another vehicle. In addition, when the extremely short detection distance and the generation of noise are due to exterior environments, the extremely short detection distance and the generation of noise are frequently continued as long as the exterior environments continue. Focusing on these points, in the above configuration, an occurrence frequency of a disturbance signal at the same time within a predetermined transmission time period determined with reference to a transmission period of the search wave is detected to determine presence or absence of disturbance based on the detected occurrence frequency. The above configuration can separately detect presence or absence of the influence of exterior environments and actual obstacles from each other. As a result, the situation can be accurately determined where the reliability of the detection information of an object becomes lower due to the influence of exterior environments.

It will be appreciated that the present invention is not limited to the configurations described above, but any and all modifications, variations or equivalents, which may occur to those who are skilled in the art, should be considered to fall within the scope of the present invention.

What is claimed is:

1. An object detection apparatus which is applied to a movable body including an object detection sensor which transmits a search wave and receives a reflected wave of the search wave as detection information of an object during a detection time period, and detects the object present around the movable body based on the detection information, the apparatus comprising:
    a disturbance determination section which determines a presence or an absence of an occurrence of a disturbance based on an occurrence frequency of disturbance signals detected by a frequency detection section; and
    a distance calculation section which calculates a distance between the movable body and the object based on a time when the reflected wave is received,
    wherein a reflected signal received during a predetermined distance detection time period is determined to be a first disturbance signal, the predetermined distance detection time period having a start time that is the same as a start time of the detection time period and having an end time that is before an end time of the detection time period,
    wherein a reception signal received during a noise detection time period is determined to be a second disturbance signal, the noise detection time period being before a transmission time period of the search wave and the detection time period of the object, and
    wherein the frequency detection section is configured to detect the occurrence frequency of the disturbance signals, the disturbance signals comprising at least one of the first disturbance signal and the second disturbance signal.

2. The object detection apparatus according to claim 1, further comprising a speed detection section which detects a speed of the moveable body,
    wherein the disturbance determination section determines the presence or the absence of the occurrence of the disturbance based on a condition that the speed is equal to or more than a predetermined speed.

3. The object detection apparatus according to claim 1, wherein
    the object detection sensor is an ultrasonic sensor which transmits an ultrasonic wave as the search wave.

* * * * *